United States Patent [19]

Rodi

[11] Patent Number: 5,784,964
[45] Date of Patent: Jul. 28, 1998

[54] MACHINE FRAME AND METHOD OF MANUFACTURE THEREOF

[75] Inventor: Anton Rodi, Leimen, Germany

[73] Assignee: Heidelberger Druckmaschinen AG, Heidelberg, Germany

[21] Appl. No.: 631,611

[22] Filed: Apr. 10, 1996

[30] Foreign Application Priority Data

Apr. 10, 1995 [DE] Germany ............ 195 13 537.7

[51] Int. Cl.[6] .................................................. B41F 5/04
[52] U.S. Cl. .................................. 101/480; 101/219
[58] Field of Search .......................... 101/479, 480,
101/212, 213, 216, 219, 494; 29/445, 557,
DIG. 26

[56] References Cited

U.S. PATENT DOCUMENTS

| | | | |
|---|---|---|---|
| 1,743,468 | 1/1930 | Marshall | 101/213 |
| 2,351,612 | 6/1944 | Hawley | 101/216 |
| 2,447,887 | 8/1948 | Worthington | 101/216 |
| 2,479,023 | 8/1949 | Peyrebrune et al. | 101/216 |
| 3,599,313 | 8/1971 | Litvin | 29/445 |
| 4,084,501 | 4/1978 | Kerwin et al. | 101/219 |
| 4,475,457 | 10/1984 | Davison | 101/219 |
| 4,887,531 | 12/1989 | Ichikawa et al. | 101/216 |
| 5,464,289 | 11/1995 | Beaudry | 101/219 |

FOREIGN PATENT DOCUMENTS

| | | |
|---|---|---|
| 0 470 583 A2 | 2/1992 | European Pat. Off. . |
| 2652141 | 8/1977 | Germany . |
| 33 44 440 A1 | 7/1984 | Germany . |
| 37 20 631 A1 | 1/1989 | Germany . |
| 3720631 | 1/1989 | Germany . |
| 4128864 | 3/1993 | Germany . |
| 4326387 | 2/1995 | Germany . |

*Primary Examiner*—Eugene H. Eickholt
*Attorney, Agent, or Firm*—Laurence A. Greenberg; Herbert L. Lerner

[57] ABSTRACT

Machine for producing three-dimensional structures on a substrate having at least two individual aggregate components, includes a machine frame whereon the aggregate components are mounted at predetermined relative positions, the machine frame being of one-piece lightweight construction and having fitting devices for the individual aggregate components, the fitting devices being formed at the predetermined relative positions on the machine frame.

12 Claims, 1 Drawing Sheet

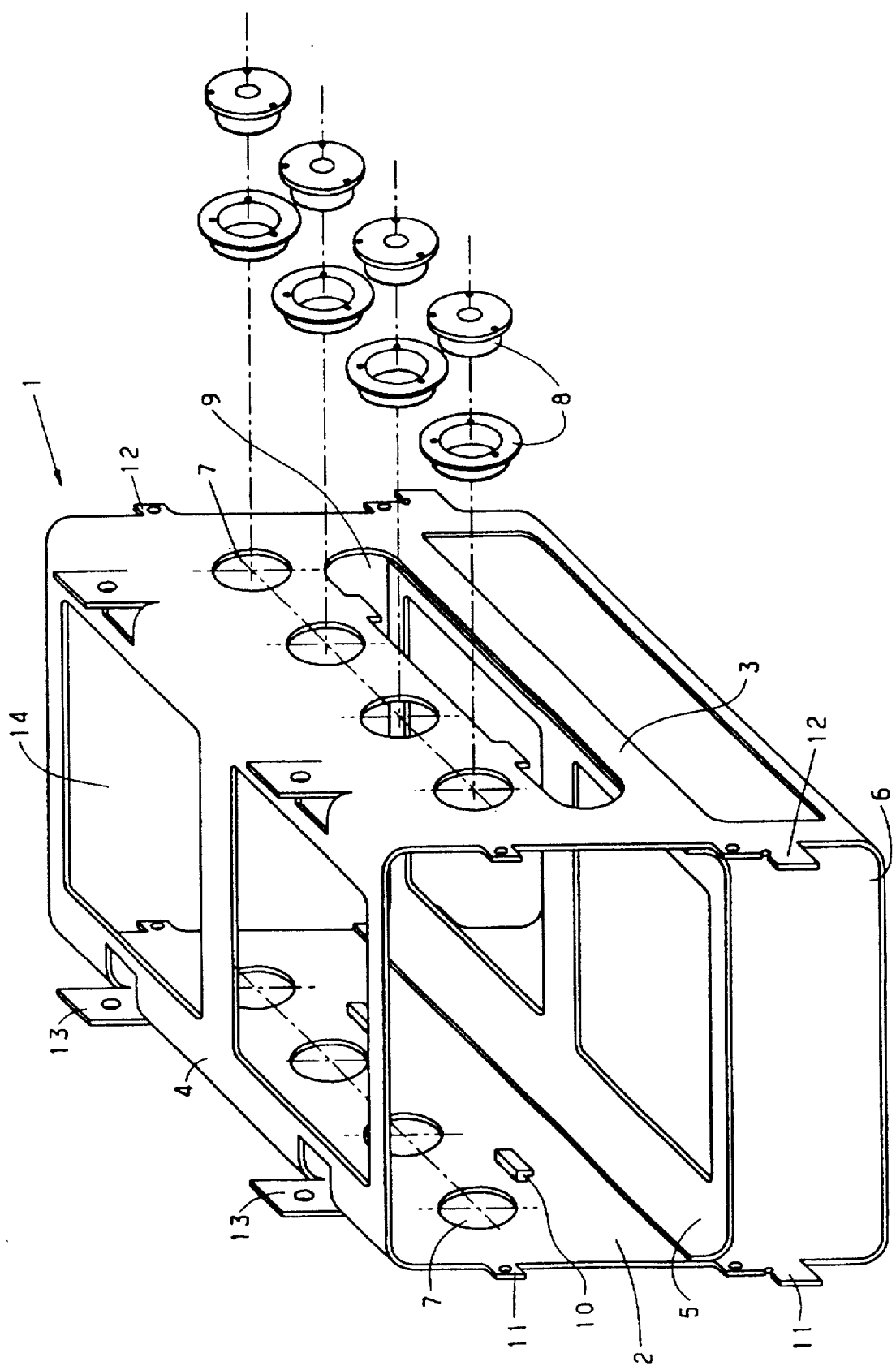

MACHINE FRAME AND METHOD OF MANUFACTURE THEREOF

BACKGROUND OF THE INVENTION

Field of the Invention

The invention relates to a machine frame and, more particularly, to a machine for producing three-dimensional structures on a substrate, the machine having the machine frame and at least two individual aggregate components which are mounted on the machine frame at predetermined relative positions, and the invention further relates to a method for manufacturing the machine frame of this machine.

The machine for producing three-dimensional structures on a substrate is primarily meant to be a printing press having several individual aggregate components, such as press rollers and printing units, respectively, paper transport devices, paper turning devices, feeders, deliveries, and so forth, which are fastened to a common machine frame.

This machine frame, in conventional printing presses, is formed of a base frame and side walls to which the individual aggregate components are fastened. The base frame and the side walls are formed consist of separately prefabricated parts, generally of multiple parts, respectively, having fitting elements for assembly and for the individual aggregate components and parts thereof, respectively.

Because the individual aggregate components and parts thereof, respectively, have to occupy quite specific, precisely determined positions in the printing press, the individual parts of the machine frame are manufactured from the start with as high precision as possible. However, any deviations between actual and reference or nominal dimensions occurring in the manufacture, which would by themselves, i.e., individually, be tolerable, can accumulate during the assembly of the individual parts of the machine frame. Furthermore, flat or elongated individual parts can easily be deformed inadvertently. Therefore, during the assembly of conventional printing presses or machines, extensive adjustment work is required more or less, whether with the assembly of the machine frame or with the subsequent installation of the individual aggregate components in or on the frame, usually with both. When maintenance work is to be performed on a press or machine which requires the installation and removal of individual aggregate components or parts thereof, additional adjustment work is necessary.

The precision required in the manufacture and assembly of the individual parts of the machine frame and the additionally required installation and adjustment work are significant cost factors with regard to heretofore known printing presses or machines. A compromise between these factors would be the most economic solution. When such a compromise has been found, then no further economies or cost reductions are usually achievable, because then, for example, the additional investment to achieve higher precision in the prefabrication of the individual parts would be greater than the corresponding relative reduction in expenditure for installation and adjustment.

This problem exists not only in connection with printing presses or machines but also in connection with other devices or apparatuses for producing on a substrate three-dimensional structures, such as writing, i.e., script or print, or pictures, which have two dimensions in the substrate plane and usually a considerably smaller dimension extending perpendicularly to the substrate. Such structures are formed, for example, through selective application of a pigment-containing substance on a substrate like paper, as is the case with laser printers or photostatic copiers, or through physical interaction with a substrate, as is the case with thermal printers. To ensure the transfer of the writings and pictures onto the substrate in exact correspondence with the half-tone images thereof, the individual aggregate components of such devices or apparatuses, such as the the ink transfer and paper transport devices, must be positioned very precisely, particularly when multiple colors are provided.

SUMMARY OF THE INVENTION

It is accordingly an object of the invention to provide a machine frame and a method of manufacture thereof wherein the manufacturing costs are reduced which, in view of the hereinaforedescribed problems, means that high precision is achieved by simple means, and the expenditure of time for assembly is minimized.

With the foregoing and other objects in view, there is provided, in accordance with one aspect of the invention, in a machine for producing three-dimensional structures on a substrate having at least two individual aggregate components, a machine frame whereon the aggregate components are mounted at predetermined relative positions, the machine frame being of one-piece light-weight construction and comprising fitting devices for the individual aggregate components, the fitting devices being formed at the predetermined relative positions on the machine frame.

In accordance with another feature of the invention, the machine frame is formed predominantly of sheet metal.

In accordance with a further feature of the invention, the machine frame is formed with two side walls spaced apart so that the aggregate components are disposed therebetween, at least one wall extending transversely to the side walls and connecting the side walls to one another, at least one of the side and the connecting walls being formed with at least one opening therein through which one of the aggregate components is insertable into the machine frame and serving also as the respective fitting device for the one aggregate component.

In accordance with an added feature of the invention, the sheetmetal machine frame has a rectangular profile.

In accordance with an additional feature of the invention, the fitting devices are precisely finished recesses formed in the machine frame.

In accordance with yet another feature of the invention, the fitting devices are projections extending from the machine frame.

In accordance with yet a further feature of the invention, the fitting devices include precisely finished recesses formed in the machine frame, and projections extending from the machine frame.

In accordance with yet an added feature of the invention, the machine is a printing press, and the aggregate components comprise any of printing units, press rollers, paper transport devices, paper turning devices, feeders and deliveries.

In accordance with another aspect of the invention, there is provided a method for manufacturing a machine frame for accepting thereon individual aggregate components of a machine for producing three-dimensional structures on a substrate, which comprises manufacturing a solid framework of light-weight structural material, and forming thereon a plurality of fitting devices for the aggregate components by non-reactive precision processing.

In accordance with another mode of the method according to the invention, the light-weight structural material of which the solid frame-work is manufactured is primarily sheetmetal.

In accordance with a further mode, the method of the invention includes forming the frame-work as a one-piece machine frame having a rectangular profile with two side walls and at least one connecting wall extending transversely to the side walls, and precision-finishing at least one opening in at least one of the walls for receiving therein one of the aggregate components of the machine and for also serving as the fitting device for the respective one aggregate component.

In accordance with an added mode, the method of the invention includes precision-finishing any of the recesses in the machine frame and projections on the machine frame, respectively, to form the fitting devices.

In accordance with an additional mode, the method includes applying laser beams for the precision finishing.

In accordance with a concomitant mode of the method of the invention, the machine for which the machine frame is being manufactured is a printing press, and the individual aggregate components thereof are any of printing units, press rollers, paper transport devices, paper turning devices, feeders and deliveries.

Because it matters only that the mutual relative positions of the individual aggregate components be precisely maintained, the machine frame itself may be prefabricated with comparatively little precision. The shape of this prefabricated frame as a whole will not be altered later, either during the subsequent precision-finishing of the fitting devices, i.e., the individual locations for fittingly placing or positioning and the in-register application of the individual aggregate components, respectively, or during the installation and maintenance, respectively, of the individual aggregate components.

In this regard, it is a primary requirement that the precision finishing be performed so as to be non-reactive, i.e., without deformation of the machine frame, and so that the individual aggregate components can be installed without having to be disassembled and so that they are readily accessible, respectively.

In view of the foregoing first requirement, i.e., that of being non-reactive, the use of laser finishing tools is ideal. With such tools, on the one hand, the individual fitting devices, such as bore holes, for example, can be produced with precision in any desired shape and be suitably varied by individual finishing, respectively, and, on the other hand, the force freedom makes it rather easy also to establish the mutual relative positions of the fitting devices with the desired precision. The fitting devices created in this manner permanently determine the positions of the individual aggregate components in the printing press, so that no adjustment work will have to be performed later either with the installation of the individual aggregate components or with the maintenance thereof.

Besides laser beams, charged particles, such as ion beams or electron beams can also be used for finishing. Furthermore, essentially non-reactive finishing can also be performed by some mechanical methods, for example, by grinding. Because this precision finishing has to take place only at certain individual spots of the machine frame and no more adjustment work is required afterwards, the machine and method according to the invention are, as a whole, more economical than according to the prior art.

Non-reactive finishing permits the machine frame to be manufactured from light-weight material, preferably from sheetmetal, so that a further reduction of costs can be achieved. The necessary rigidity of a sheetmetal frame having a lightweight construction can be achieved by suitable constructive measures.

The second requirement mentioned hereinbefore, namely easy installation and access of the individual aggregate components, can equally be ensured by suitable construction of the machine frame. In a preferred embodiment of the invention, as aforementioned, the machine frame has two side walls between which the individual aggregate components are arranged, the side walls being connected to one another by at least one wall extending transversely to the side walls. Openings in the walls permit the installation of the individual aggregate components, as well as access thereto in the installed state. When the installation openings are finished with the required precision, they automatically fulfill the function of fitting devices for the appertaining individual aggregate components.

The side walls and the at least one wall extending transversely thereto are preferably parts arranged in parallel and at right angles, respectively, to one another, the parts being portions of a one-piece sheetmetal frame formed, for example, as a unipartite bent metal sheet and of welded-together individual bent metal sheets, respectively.

Besides the aforementioned installation openings in the machine frame, any possible recesses in or projections from the machine frame can serve as fitting devices which, at least in part, are finished with precision to form connecting or fixing locations or positions for the individual aggregate components.

Although the preferred embodiment described in detail herein concerns a printing press or machine having several individual aggregate components, such as printing units and press rollers, respectively, paper transport devices, paper turning devices, feeders or deliveries, the invention is also applicable with like advantages to related devices or apparatuses, such as photostatic copiers, and so forth, as previously mentioned hereinbefore.

Other features which are considered as characteristic for the invention are set forth in the appended claims.

Although the invention is illustrated and described herein as embodied in a machine frame and method of manufacture thereof, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying single figure of a drawing, which is, namely:

BRIEF DESCRIPTION OF THE DRAWING

A perspective view of a one-piece machine frame for a printing press in accordance with the invention is shown in FIG. 1.

DESCRIPTION OF THE PREFERRED EMBODIMENT

Referring now to the figure of the drawing, there is shown therein a machine frame 1 which is a one-piece sheetmetal frame having side walls 2 and 3 disposed in parallel and at a spaced distance from one another, the distance being greater than the printing width of a printing press or machine to be assembled with the machine frame 1 as a base, and including an upper wall 4, a center wall 5 and a lower wall 6, all disposed perpendicularly to the side walls 2 and 3 and connecting the sidewalls 2 and 3 to one another. The machine frame 1 is a light-weight, sturdy unit which may be made even more rigid by non-illustrated reinforcing seams on the walls 2 to 6. Moreover, the ends of the machine frame 1 which are left open, as shown in the drawing, and through which the paper passes while being fed and delivered, respectively, may be closed partially by reinforcing or stiffening metal sheets.

Each side wall 2, 3 has multiple circular bores 7 formed therein through which non-illustrated press rollers can be inserted into the machine frame 1. The bores 7 have a quite specific diameter and are located in precisely predetermined positions relative to one another, i.e. a bore 7 in the side wall 2 is exactly aligned with an opposite bore 7 in the side wall 3, and the bores 7 in each side wall 2, 3 are arranged in tandem behind one another in precisely predetermined spaced relationship, so as to be in correspondence with the constructive arrangement of the press rollers in the printing press. Bearing bushings 8 for the press rollers fit exactly into the bores 7 and are fastened therein by non-illustrated conventional means.

The side wall 3 is furthermore formed with a longitudinally extending slot 9 disposed in parallel with the row of bores 7. The slot 9 serves to hold a non-illustrated conventional paper transport device which is supported by bearing blocks 10 provided at the opposite side wall 2.

The side walls 2 and 3, at the open ends of the machine frame 1, are provided with projections 11 and 12 for position-fixing with respect to a conventional non-illustrated feeder and delivery, respectively. Furthermore, straps or fishplates 13 project outwardly from the edges of the side walls 2 and 3 adjoining the upper wall 4 and serve to connect the machine frame 1 to outside aggregate components.

The upper and center side walls 4 and 5, respectively, have large-area openings 14 formed therein which provide service access to the interior of the printing press or machine. A hollow space between the lower wall 6 and the center wall 7 can be used for auxiliary equipment, for example, for the printing-press electronics.

The machine frame 1 is manufactured, first, by creating a semifinished product by suitably cutting, bending and welding sheetmetal without any great demands as to precision.

Thereafter, the machine frame 1 as a whole is clamped into a suitably dimensioned device for laser finishing, and the contours of the bores 7, the slots 9, the bearing blocks 10 and the projections 11 and 12, as well as the bores in the fishplates 13, are finished with the highest precision, so that the dimensions and contours thereof themselves as well as of the mutual relative positions thereof are established with a precision tolerance of 10 μm or less.

Due to the non-reactiveness of laser finishing, the machine frame 1 does not become deformed and the once-established relative positions of the contours of the bores 7, the slots 9, the bearing blocks 10, the projections 11 and 12 and the fishplates 13 serving as connecting and fixing stations, respectively, remain permanent.

While not limited to any special printing press or machine, the exemplary embodiment of the invention illustrates various possibilities of how, in a machine frame prefabricated as a semifinished product, precisely positioned connecting and fixing positions, respectively, for a random number of individual aggregate components are formed, not only for press rollers, paper transport devices and feeders and deliveries, respectively, but also for printing units which are installed or assembled as a coherent unit, for copiers or parts thereof, for paper turning devices and many other aggregate units or components.

I claim:

1. In a machine for producing three-dimensional structures on a substrate having a plurality of individual aggregate components, a machine frame whereon the aggregate components are mounted at predetermined relative positions, the machine frame comprising:

a one-piece light-weight frame having fitting devices formed thereat for securing the individual aggregate components to said one-piece frame, said fitting devices being formed at predetermined relative positions on said one-piece frame; and said fitting devices including a plurality of press roller fitting devices, a paper transport fitting device, sheet-feeding fitting devices and sheet delivery fitting devices.

2. Machine according to claim 1, wherein said one-piece frame is formed predominantly of sheet metal.

3. Machine according to claim 2, wherein said one-piece frame is formed with two side walls spaced apart so that the aggregate components are disposed therebetween, at least one wall extending transversely to said side walls and connecting said side walls to one another, at least one of said side and said connecting walls being formed with at least one of said paper transport fitting device and one of said plurality of press roller fitting devices through which one of the aggregate components is insertable into said one-piece frame and serving also as the respective fitting device for the one aggregate component.

4. Machine according to claim 2, wherein said sheetmetal one-piece frame has a rectangular profile.

5. Machine according to claim 3, wherein said plurality of press roller fitting devices and said paper transport fitting device are precisely finished recesses formed in said one-piece frame.

6. Machine according to claim 3, wherein said sheet-feeding fitting devices and said sheet delivery fitting devices are projections extending from said one-piece frame.

7. Machine according to claim 3, wherein said fitting devices include precisely finished recesses formed in said one-piece frame defining said plurality of press roller fitting devices and said paper transport fitting device, and projections extending from said one-piece frame defining said sheet-feeding fitting devices and said sheet delivery fitting devices.

8. Machine according to claim 1, wherein the machine is a printing press and wherein the aggregate components comprise any of printing units, press rollers, paper transport devices, paper turning devices, feeders and deliveries.

9. Method for manufacturing a machine frame for accepting thereon individual aggregate components of a machine for producing three-dimensional structures on a substrate, which comprises:

manufacturing a solid frame-work of light-weight structural material;

forming thereon a plurality of fitting devices for the aggregate components by non-reactive precision processing; and during the forming step, applying laser beams for precision-finishing recesses in the solid frame-work and projections on the solid frame-work, respectively, to form the fitting devices.

10. Method according to claim 9, wherein the light-weight structural material of which the solid frame-work is manufactured is primarily sheetmetal.

11. Method according to claim 10, which includes forming the frame-work as a one-piece machine frame having a rectangular profile with two side walls and at least one connecting wall extending transversely to the side walls, and precision-finishing at least one opening in at least one of the walls for receiving therein one of the aggregate components of the machine and for also serving as the fitting device for the respective one aggregate component.

12. Method according to claim 9, wherein the machine for which the machine frame is being manufactured is a printing press, and the individual aggregate components thereof are any of printing units, press rollers, paper transport devices, paper turning devices, feeders and deliveries.

* * * * *